United States Patent
Sadatoshi et al.

(10) Patent No.: US 6,441,081 B1
(45) Date of Patent: Aug. 27, 2002

(54) POLYPROPYLENE-BASE RESIN COMPOSITION AND PRODUCTS OF INJECTION MOLDING THEREOF

(75) Inventors: Hajime Sadatoshi; Kenichi Ohkawa; Susumu Kanzaki, all of Ichihara; Hisayuki Iwai, Aichi-ken; Takao Nomura, Toyota; Shoichi Ichikawa, Nisshin, all of (JP)

(73) Assignees: Sumitomo Chemical Company, Limited, Osaka (JP); Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/555,826
(22) PCT Filed: Oct. 1, 1999
(86) PCT No.: PCT/JP99/05412
§ 371 (c)(1),
(2), (4) Date: Jul. 11, 2000
(87) PCT Pub. No.: WO00/20497
PCT Pub. Date: Apr. 13, 2000

(30) Foreign Application Priority Data

Oct. 5, 1998 (JP) .......................... 10-282488

(51) Int. Cl.⁷ .......................... C08K 3/34; C08L 23/08; C08L 23/12; C08L 23/16
(52) U.S. Cl. .......................... 524/451; 524/505; 525/88; 525/240
(58) Field of Search .......................... 524/505, 451; 525/88, 240

(56) References Cited

U.S. PATENT DOCUMENTS

| | | | |
|---|---|---|---|
| 4,211,690 A | * 7/1980 | Asano et al. | 524/427 |
| 5,039,748 A | * 8/1991 | Wakatsuki et al. | 525/216 |
| 5,723,527 A | 3/1998 | Sadatoshi et al. | |
| 5,763,534 A | * 6/1998 | Srinivasan et al. | 525/240 |
| 5,777,020 A | * 7/1998 | Nagai et al. | 524/451 |
| 5,852,100 A | 12/1998 | Sadatoshi et al. | |
| 5,990,220 A | * 11/1999 | Sobajima et al. | 524/449 |
| 6,011,102 A | * 1/2000 | Shimojo et al. | 525/451 |
| 6,114,460 A | * 9/2000 | Hirakawa et al. | 525/290 |
| 6,306,972 B1 | * 10/2001 | Ohkawa et al. | 524/240 |

FOREIGN PATENT DOCUMENTS

| | | |
|---|---|---|
| DE | A1-19821718 | 11/1998 |
| DE | A1-19821937 | 11/1998 |
| EP | 496625 | * 7/1992 |
| EP | 0739913 A1 | 10/1996 |
| EP | A1739941 | 10/1996 |
| EP | A1739943 | 10/1996 |
| EP | 0774489 A1 | 5/1997 |
| EP | 789054 | * 8/1997 |
| EP | 844281 | * 5/1998 |
| EP | A1841369 | 5/1998 |
| JP | A892440 | 4/1996 |
| JP | A987478 | 3/1997 |
| JP | A9194646 | 7/1997 |
| JP | A10139959 | 5/1998 |
| JP | A10139960 | 5/1998 |
| JP | A11130925 | 5/1999 |

\* cited by examiner

*Primary Examiner*—Vasu Jagannathan
*Assistant Examiner*—Callie E. Shosho
(74) *Attorney, Agent, or Firm*—Birch, Stewart, Kolasch & Birch, LLP

(57) ABSTRACT

A polypropylene resin composition which comprises:

(1) 55 to 75% by weight of (A) a polypropylene resin consisting of a mixture of the following polymers (i) and (ii):
  (i) a propylene-ethylene block copolymer having a propylene homopolymer part which is the first segment and having a propylene-ethylene random copolymer part which is the second segment and
  (ii) a propylene homopolymer having an intrinsic viscosity $[\eta]P$ of 0.8 to 1.8 dl/g as measured in tetralin at 135° C.,
(2) 21 to 30% by weight of (B) an ethylene-1-octene copolymer rubber having a melt flow rate (JIS-K-6758 at 190° C.) of 2 to 10 g/10 min and having a 1-octene component content of 20 to 25% by weight, and
(3) 5 to 20% by weight of (C) talc having an average particle diameter of not more than 3 $\mu$m, wherein when the amount of the second segment contained in the propylene-ethylene block copolymer of the polypropylene resin (A) is designated as (A)' and the ethylene-1-octene copolymer rubber content is designated as (B)', the following expression is satisfied:

$$0.10 \leq \{(A)'/[(A)'+(B)']\} \leq 0.30,$$

and when the above composition is subjected to a tensile test according to ASTM D638, it exhibits, an ultimate elongation of at least 400%, and the melt flow rate (JIS-K-6758 at 230° C.) of the composition is at least 30 g/10 min, and an injection-molded article obtained by injection molding the above polypropylene resin composition.

10 Claims, No Drawings

POLYPROPYLENE-BASE RESIN COMPOSITION AND PRODUCTS OF INJECTION MOLDING THEREOF

This application is the national phase under 35 U.S.C. §371 of PCT International Application No. PCT/JP99/05412 which has an International filing date of Oct. 1, 1999, which designated the United States of America.

TECHNICAL FIELD

This invention relates to a polypropylene resin composition and an injection-molded article thereof. Particularly, it relates to a polypropylene resin composition characterized by being excellent in rigidity and impact resistance in respect of physical properties, having a short molding cycle in respect of injection moldability and by surface quality such as neither flow mark nor weld line being developed, no surface strain being caused, and the like and to an injection-molded article thereof. More particularly, it relates to a polypropylene resin composition which comprises a specific polypropylene resin as the main component, a specific ethylene-1-octene copolymer rubber component and talc, which is excellent in physical properties and injection moldability as mentioned above, and to an injection-molded article excellent in dimensional stability formed by molding the same by an injection molding method, particularly to an injection-molded article for exterior automotive trim (bumper or the like).

BACKGROUND ART

Recently, as a material for exterior automotive trim, there have been widely used propylene-ethylene block copolymer materials in view of weight-saving, cost reduction and the like.

However, the propylene-ethylene block copolymer is low in impact strength, and in order to improve this impact strength, it has been proposed to blend a propylene-ethylene block copolymer with an ethylene-propylene copolymer rubber, an ethylene-1-octene copolymer rubber or the like as stated in JP-A-53-22552, JP-A-6-192500, JP-A-6-248156, JP-A-6-192506 and JP-A-53-40045. However, when an ethylene-propylene copolymer rubber, an ethylene-1-octene copolymer rubber or the like is blended, impact strength is improved but, contrarily, thermal properties such as heat distortion temperature and the like and rigidity are deteriorated, and as a material for exterior automotive trim, it has a fault.

In order to solve this, further compounding the above composition with an inorganic filler such as calcium carbonate, barium sulfate, mica, crystalline calcium silicate, talc or the like is proposed in, for example, JP-A-51-136735, JP-A-53-64256, JP-A-53-64257, JP-A-57-55952, JP-A-57-207630, JP-A-58-17139, JP-A-58-111846, JP-A-59-98157, JP-B-55-3374 and the like.

However, a conventional material of a system consisting of a propylene-ethylene block copolymer/ethylene-propylene copolymer rubber or ethylene-1-octene copolymer rubber/inorganic filler has still been insufficient as a material for exterior automotive trim in respect of injection moldability and balance between impact strength and rigidity.

DISCLOSURE OF INVENTION

Under such circumstances, this invention aims at providing a polypropylene resin composition which is good in balance between impact strength and rigidity and excellent in injection moldability such as no flow mark being developed or the like and providing an injection-molded article thereof.

The present inventors have found that a polypropylene resin composition satisfying the above object and an injection-molded article thereof are obtained by using mainly a polypropylene resin and adding thereto a specific rubber component at a specific composition ratio and have reached this invention. That is to say, this invention relates to a polypropylene resin composition which comprises:

(1) 55 to 75% by weight of (A) a polypropylene resin consisting of a mixture of the following polymers (i) and (ii):
  (i) a propylene-ethylene block copolymer having a propylene homopolymer part which is the first segment and having a propylene-ethylene random copolymer part which is the second segment and
  (ii) a propylene homopolymer having an intrinsic viscosity [η]P of 0.8 to 1.8 dl/g as measured in tetralin at 135° C.,
(2) 21 to 30% by weight of (B) an ethylene-1-octene copolymer rubber having a melt flow rate (JIS-K-6758 at 190° C.) of 2 to 10 g/10 min. and having a 1-octene component content of 20 to 25% by weight, and
(3) 5 to 20% by weight of (C) talc having an average particle diameter of not more than 3 μm, wherein when the amount of the second segment contained in the propylene-ethylene block copolymer of the polypropylene resin (A) is designated as (A)' and the ethylene-1-octene copolymer rubber content is designated as (B)', the following expression is satisfied:

$$0.10 \leq \{(A)'/[(A)'+(B)']\} \leq 0.30,$$

and when the above composition is subjected to a tensile test according to ASTM D638 at 23° C., it exhibits an ultimate elongation of at least 400%, and wherein the melt flow rate (JIS-K-6758 at 230° C.) of the composition is at least 30 g/10 min., and also to an injection-molded article obtained by injection molding the above polypropylene resin composition.

This invention is explained in detail below.

In this invention, the polypropylene resin (A) means a polypropylene resin which comprises mainly a polymer mixture of the above propylene-ethylene block copolymer (i) having a propylene homopolymer part which is the first segment and having a propylene-ethylene random copolymer part which is the second segment with the above propylene homopolymer (ii) having an intrinsic viscosity [η]P of 0.8 to 1.8 dl/g as measured in tetralin at 135° C. As to the ratio between (i) and (ii), there is usually used one having a ratio of 90% by weight–60% by weight of (ii) to 10% by weight–40% by weight of (i) (provided (i)+(ii)= 100% by weight).

The polypropylene resin (A) in this invention has a Q value, which is the weight average molecular weight (Mw)/number average molecular weight (Mn) ratio which represents the molecular weight distribution according to the gel permeation chromatography (GPC) of the propylene homopolymer part of the polypropylene resin (A), of preferably 3.0 to 5.0, more preferably 3.5 to 4.5. When the Q value is less than 3.0, the flow properties are deteriorated, and when the Q value exceeds 5.0, no preferable result is obtained with respect to balance between rigidity and impact property in some cases.

Here, the propylene homopolymer part of the polypropylene resin (A) means both the first segment part of the propylene-ethylene block copolymer (i) and the propylene homopolymer (ii).

Particularly preferable physical properties, compositions and the like of the propylene homopolymer (ii) in the polypropylene resin (A) are as follows:

That is, the Q value is preferably 3.0 to 5.0, more preferably 3.5 to 4.5 and, in addition, the isotactic pentad fraction calculated by $^{13}$C-NMR is at least 0.97, preferably at least 0.98. When the isotactic pentad fraction is less than 0.97, it is difficult in some cases to satisfy the objective rigidity, heat resistance and the like.

Moreover, the intrinsic viscosity [η]P is 0.8 to 1.8 dl/g, preferably 0.9 to 1.6 dl/g, as measured in tetralin at 135° C. When the intrinsic viscosity [η]P is less than 0.8 dl/g, the impact strength becomes low and no preferable result is obtained in respect of physical properties. Furthermore, when the intrinsic viscosity exceeds 1.8 dl/g, the flow properties are deteriorated.

In the case of the propylene-ethylene block copolymer (i) in the polypropylene resin (A) which copolymer has the propylene homopolymer part as the first segment and the propylene-ethylene random copolymer part as the second segment, those physical properties, compositions and the like which are particularly preferably required are as follows:

In the propylene-ethylene block copolymer (i) the physical properties of the propylene homopolymer part which is the first segment are the same as those of the above-mentioned propylene homopolymer (ii). That is, the Q value is 3.0 to 5.0, preferably 3.5 to 4.5 and the isotactic pentad fraction calculated by $^{13}$C-NMR is at least 0.97, preferably at least 0.98. Moreover, the intrinsic viscosity [η]P is 0.8 to 1.8 dl/g, preferably 0.9 to 1.6 dl/g, as measured in tetralin at 135° C.

The propylene homopolymer part which is the first segment of the propylene-ethylene block copolymer (i) can be obtained by taking the same out of the polymeriation vessel after the polymerization of the propylene homopolymer part in the first step of the production of the block copolymer (i). From the propylene homopolymer taken out, [η]P can be determined.

The amount of the propylene-ethylene random copolymer part which is the second segment contained in the propylene-ethylene block copolymer (i) is 5 to 30% by weight, preferably 10 to 20% by weight.

The ethylene content [(C2') EP] of the propylene-ethylene random copolymer part is preferably 25 to 55% by weight, more preferably 30 to 50% by weight. When the ethylene content is less than 25% by weight or exceeds 55% by weight, no preferable result is obtained in some cases with respect to the impact resistance of the composition. The intrinsic viscosity [η]EP of the propylene-ethylene random copolymer part is preferably 2.5 to 6.0 dl/g, more preferably 3.0 to 6.0 dl/g. When the intrinsic viscosity is less than 2.5 dl/g, no preferable result is obtained in some cases with respect to balance between rigidity and impact property. Moreover, when it exceeds 6.0 dl/g, granular structure portions are generated and no preferable result is obtained in some cases in respect of surface quality.

The methods of measuring the above-mentioned various physical properties are explained. The isotactic pentad fraction is the fraction of the propylene monomer unit existing at the center of an isotactic chain in pentad unit, in other words, a chain in which five propylene monomer units are successively meso-bonded, in the polypropylene molecular chain which is measured according to the method disclosed in A. Zambelli et al., Macromolecules, 6, 925 (1973), namely, measured using $^{13}$C-NMR. However, the attribution of NMR absorption peak is based on Macromolecules, 8, 687 (1975) published subsequently.

Specifically, the isotactic pentad fraction is determined as the area fraction of mmmm peak of the total absorption peak in the methyl carbon region of the $^3$C-NMR spectrum. According to this method, the isotactic pentad fraction of the NPL Standard Substance CRM No. M19-14 Polypropylene PP/MWD/2 of NATIONAL PHYSICAL LABORATORY in Great Britain was measured to obtain 0.944.

In the propylene-ethylene block copolymer (i), the weight ratio X of the propylene-ethylene random copolymer part to the total block copolymer can be determined by calculation from the following equation by measuring the amount of heat of crystal fusion of each of the propylene homopolymer part: and the total block copolymer:

$$X=1-(\Delta Hf)T/(\Delta Hf)P$$

wherein (ΔHf)T and (ΔHf)P represent the following, respectively:

(ΔHf)T: Amount of heat of fusion of the total block copolymer (cal/g).

(ΔHf)P: Amount of heat of fusion of the propylene homopolymer part (cal/g).

Moreover, the ethylene content of the propylene-ethylene random copolymer can be determined by calculation from the following equation after measuring in weight % the ethylene content of the total block copolymer by an infrared absorption spectrum method:

$$(C2')EP=(C2')T/X$$

wherein (C2')T and (C2')EP represent the following, respectively:

(C2')T: Ethylene content (weight %) of the total block copolymer.

(C2')EP: Ethylene content (weight %) of the propylene-ethylene random copolymer part.

Moreover, in the propylene-ethylene block copolymer (i), the intrinsic viscosity [η]EP of the propylene-ethylene random copolymer part as measured in tetralin at 135° C. can be determined by calculation from the following equation by determining the intrinsic viscosity of each of the homopolymer part and the total block copolymer:

$$[\eta]EP=[\eta]T/X-(1/X-1)\,[\eta]P$$

wherein [η]P and [η]T represent the following, respectively:

[η]P: Intrinsic viscosity (dl/g) of the propylene homopolymer part.

[η]T: Intrinsic viscosity (dl/g) of the total block copolymer.

The propylene-ethylene block copolymer used in this invention is a product obtained by polymerizing propylene in the presence of, for example, a stereoregular polymerization catalyst to produce the crystalline propylene homopolymer part which is the first segment and successively copolymerizing propylene and ethylene to produce the propylene-ethylene random copolymer part which is the second segment and, in the strict meaning, is a composition of the first segment and the second segment.

The above block copolymer can be produced by a known method such as a slurry polymerization method, a gas phase polymerization method or the like.

The melt flow rate (MFR) at 190° C. of the ethylene-1-octene copolymer rubber (B) is 2 to 10 g/10 min. When the MFR at 190° C. exceeds 10 g/10 min, no preferable result is obtained with respect to impact strength and when the MFR at 190° C. is less than 2 g/10 min, the dispersion thereof in the polypropylene (A) is bad and no preferable result is obtained with respect to impact strength.

The ethylene-1-octene copolymer rubber (B) has a 1-octene component content of 20 to 25% by weight. When the 1-octene component content is less than 20% by weight, no preferable result is obtained with respect to impact resistance and when it exceeds 25% by weight, no preferable result is obtained with respect to rigidity, and the appearance of a molded article is adversely affected by development of flow mark due to the deterioration of flow properties and the like.

It is preferable that the ethylene-1-octene copolymer rubber (B) has a density of 0.860 to 0.875 g/cm$^3$, and when the density is less than 0.860 g/cm$^3$, no preferable result is obtained in some cases with respect to rigidity. On the other hand, when the density exceeds 0.875 g/cm$^3$, no preferable result is obtained in some cases with respect to impact resistance.

The ethylene-1-octene copolymer rubber (B) as mentioned above can be obtained by copolymerizing ethylene with 1-octene using a Ziegler-Natta catalyst system consisting of a vanadium compound, an organoaluminum compound and a halogenated ester compound in an inert organic solvent such as a hydrocarbon. Moreover, it can also be obtained by copolymerizing ethylene with 1-octene using a catalyst in which an alumoxane is combined with a known metallocene compound in which titanium, zirconium or hafnium is coordinated, namely a so-called metallocene catalyst.

Talc used in this invention has an average particle diameter of not more than 3 μm. When the average particle diameter is more than 3 μm, the deterioration of impact strength is large and appearance such as gloss or the like becomes bad. Talc may be used without being treated; however, talc which has been subjected to surface treatment with various usually known silane coupling agents, titanium-coupling agents, higher fatty acids, higher fatty acid esters, higher fatty acid amides, higher fatty acid salts or other surface active agents can be used for the purpose of enhancing the adhesiveness at the interface with the polypropylene resin and enhancing the dispersibility.

Here, the average particle diameter of talc means the fifty percent particle diameter D50 determined from an integral distribution curve of an undersize method obtained by subjecting to measurement a suspension of talc in a dispersing medium such as water, alcohol or the like using a centrifugal settling type particle size distribution measuring apparatus.

In this invention, the final composition is required to satisfy the following expression when the second segment content (% by weight) of the propylene-ethylene block copolymer of the polypropylene resin (A) is designated as (A)', the ethylene-1-octene copolymer rubber content (% by weight) is designated as (B)':

$$0.10 \leq \{(A)'/[(A)'+(B)']\} \leq 0.30.$$

When it is less than or more than these values, no preferable result is obtained with respect to impact strength.

The tensile elongation of the polypropylene resin composition of this invention is at least 400%. When the tensile elongation is less than 400%, brittle fracture tends to be caused and no preferable result is obtained as an exterior automotive trim molded article.

The melt flow rate (MFR) at 230° C. of the polypropylene resin composition of this invention is at least 30 g/10 min.

When the MFR is less than 30 g/10 min, the flow properties are inferior and hence molding becomes difficult.

The density of the polypropylene resin composition of this invention is preferably 0.95 to 1.05 g/m$^3$. When the density is less than or more than these values, no preferable shape as an exterior automotive trim molded article is obtained in some cases.

In order to satisfy these physical properties, the Q value, the isotactic pentad fraction, [η]P, (C2')EP, [η]EP and the like are adjusted.

The composition of this invention can be produced using a kneader such as a single screwextruder, a twin-screw extruder, a Banbury mixer, a hot roll or the like. The mixing of each component may be effected simultaneously or may be effected separately. As a method of the separate addition, there are, for example, a method in which the polypropylene resin (A) is mixed with talc (C) and thereafter the ethylene-1-octene copolymer rubber (B) is added, and a method in which the talc (C) is previouslymixed at a high concentration with the polypropylene resin (A) to form a master batch and this is kneaded while it is diluted with a separate polypropylene resin (A) and the ethylene-1-octene copolymer rubber (B). Moreover, as a second method of the separate addition, there are also suitably adopted a method in which the crystalline polypropylene (A) is kneaded with the ethylene-1-octene copolymer rubber (B) and thereafter the talc (C) is added and kneaded and a method in which the ethylene-1-octene copolymer rubber (B) is previously kneaded at a high concentration with the polypropylene (A) to form a master batch, and the polypropylene (A) and the talc (C) are added thereto and kneaded therewith. As a third separate addition method, there is a method in which the polypropylene (A) is previously kneaded with the talc (C), separately the polypropylene (A) is previously kneaded with the ethylene-1-octene co-polymer rubber (B) and finally the resulting mixtures are kneaded together. The temperature necessary for the kneading is 170 to 250° C. and the time is 1 to 20 minutes.

Furthermore, in the above-mentioned kneaders, the above basic components can, if necessary, be compounded appropriately with an additive such as antioxidant, ultraviolet absorber, lubricant, pigment, antistatic agent, copper-contamination-preventing agent, flame retardant, neutralizing agent, foaming agent, plasticizer, nucleating agent, antifoaming agent, cross-linking agent or the like.

The polypropylene resin composition of this invention can be formed into an injection-molded article having the above-mentioned physical properties by an injection molding method which has been generally adopted. In particular, said molded article is suitable as an exterior automotive trim molded article.

BEST MODE FOR CARRYING OUT THE INVENTION

This invention is explained below in more detail using Examples; however, this invention is not limited to these Examples.

Methods for measuring the physical properties in the Examples are shown below.

(1) Melt flow rate

Measured according to the method defined in JIS-K-6758. Unless otherwise specified, the measurement was conducted at a measuring temperature of 230° C. under a load of 2.16 kg.

(2) Flexural test

Measured according to the method defined in JIS-K-7203. A test specimen formed by injection molding was used. The thickness of the test specimen was 6.4 mm and flexural modulus (FM) and flexural strength (FS) were measured under the conditions that the span length was 100 mm and the loading rate was 2.0 mm/min. The measurement was conducted at a temperature of 23° C.

(3) Izod impact strength (IZOD)

Measured according to the method defined in JIS-K-7110. A test specimen formed by injection molding was used. The thickness of the test specimen was 6.4 mm and the impact strength of the test specimen notched after the molding was measured. The measurement was conducted at a temperature of −30° C.

(4) Tensile test

Measured according to the method defined in ASTMD638. A test specimen formed by injection molding was used. The thickness of the test specimen was 3.2 mm and ultimate elongation (UE) was measured under the condition that the drawing rate was 50 mm/min. The measurement was carried out at 23° C.

(5) Flow mark

The degree of tiger-striped pattern appearing on an injection-molded flat plate of 1.00×400×3 mm was observed with naked eye and decided as ◯ (good appearance) or × (bad appearance).

(6) Ethylene content and propylene content

The ethylene content or propylene content was determined by a calibration curve method using the absorbance of characteristic absorption of methyl group ($-CH_3$) and methylene group ($-CH_2-$) appearing in the spectrum which had been obtained by preparing a press sheet and measuring the infrared absorption spectrum thereof.

(7) Intrinsic viscosity

Reduced viscosities at three concentrations of 0.1, 0.2 and 0.5 g/dl were determined using a Ubbelohde viscometer. Intrinsic viscosity was determined by the calculation method described in "Kobunshi Yoeki, Kobunshi Jikkengaku 11" (published by Kyoritsu Shuppan Kabushiki Kaisha, 1982), page 491, that is, by an extrapolation method by which reduced viscosities are plotted against concentrations and the curve is extrapolated to zero concentration. As to the polypropylene resin, tetralin was used as a solvent and measurement was conducted at a temperature of 135° C.

(8) Molecular weight distribution (Q value)

Measured by a gel permeation chromatography (GPC) under the following conditions:

GPC: Model 150C manufactured by Waters Company.

Column: Two Shodex 80 MA columns manufactured by Showa Denko K. K.

Amount of sample: 300 µl (Polymer concentration: 0.2% by weight).

Flow rate: 1 ml/min.

Temperature: 135° C.

Solvent: o-Dichlorobenzene.

Using standard polystyrene manufactured by TOSOH CORP., a calibration curve of effluent volume and molecular weight was prepared. Using this calibration curve, the polystyrene-reduced weight average molecular weight and number average molecular weight of the test specimen were determined, and Q value {weight average molecular weight (Mw) /number average molecular weight (Mn)} was determined as a measure of molecular weight distribution.

The test specimens for evaluating physical properties in (2), (3) and (4) above were prepared under the following injection molding conditions. The composition was dried at 120° C. for 2 hours in a hot air drier and thereafter injection-molded at a molding temperature of 220° C. and a mold-cooling temperature of 50° C. for an injection time of 15 sec and a cooling time of 30 sec using an injection molding machine of Model IS150E-V manufactured by Toshiba Machine Co., Ltd.

Moreover, the following compositions were prepared under the following conditions:

A composition was prepared by preliminarily mixing uniformly the polypropylene resin (A) in the composition shown in Table 3 by means of a Henschel mixer and a tumbler, thereafter mixing and extruding the same in a twin-screw extruder (Model TEX44SS 30BW-2V manufactured by THE JAPAN STEEL WORKS, LTD.) at an extrusion rate of 30 kg/hr at a screw revolution speed of 900 rpm under vent suction.

Incidentally, the abbreviations in the Table designate the following:

BC: Propylene-ethylene block copolymer.

PP: Propylene homopolymer.

EBR: Ethylene-1-butene copolymer rubber.

EOR: Ethylene-1-octene copolymer rubber.

P part: Propylene homopolymer part in BC.

EP part: Propylene-ethylene random copolymer part in BC.

EXAMPLE 1

Under the given conditions, 20 parts by weight of a propylene-ethylene block copolymer (BC), 44 parts by weight of a propylene homopolymer (PP), 24 parts by weight of an ethylene-1-octene copolymer rubber (EOR) and 12 parts by weight of talc having an average particle diameter of 2.5 µm were kneaded and the resulting polypropylene resin composition was injection-molded to obtain a test specimen. Physical properties of various materials are shown in Tables 1 and 2, composition ratios are shown in Table 3 and the results of physical properties are shown in Table 4. The value of the formula {(A)'/[(A)'+(B)']} in this polypropylene resin composition is 0.22.

Comparative Example 1

The same treatment as in Example 1 was conducted, except that the ethylene-1-octene copolymer rubber was replaced with EOR-2 shown in Table 2. The results of physical properties are shown in Table 4. The value of the formula {(A)'/[(A)'+(B)']} in this polypropylene resin composition is 0.22.

Comparative Example 2

The same treatment as in Example 1 was conducted, except that the ethylene-1-octene copolymer rubber was replaced with EBR-1 shown in Table 2. The results of physical properties are shown in Table 4. The value of the formula {(A)'/[(A)'+(B)']} in this polypropylene resin composition is 0.22.

Comparative Example 3

The same treatment as in Example 1 was conducted, except that the ethylene-1-octene copolymer rubber was replaced with EBR-2 shown in Table 2 and the addition amount was changed to 30 parts by weight. The results of physical properties are shown in Table 4. The value of the formula {(A)'/[(A)'+(B)']} in this polypropylene resin composition is 0.18.

As compared with the Comparative Examples, the Examples of this invention are good in flow properties and flow mark and are also good in balance between and excellent in the physical properties of Izod impact strength and tensile elongation.

TABLE 1

| Sample | P part | | | EP part | | |
|---|---|---|---|---|---|---|
| | Q value | [η]P (dl/g) | mmmm | [η]EP (dl/g) | Content 1 (wt. %) | Content 2 (wt. %) |
| BC | 4.0 | 1.3 | 0.98 | 3.0 | 33 | 37 |
| PP | 4.0 | 0.9 | 0.98 | — | — | — |

BC: Propylene-ethylene block copolymer.
PP: Propylene homopolymer.
P part: The propylene homopolymer part of BC or the whole of PP.
EP part: The propylene-ethylene random copolymer part of BC.
Content 1: The content of the EP part in BC.
Content 2: The ethylene content of the EP part.
mmmm: Isotactic pentad fraction.

TABLE 2

| Sample | MFR Measuring temp. 190° C. (g/10 min) | Comonomer content (wt. %) |
|---|---|---|
| EBR-1 | 2 | 17 |
| EBR-2 | 7 | 23 |
| EOR-1 | 5 | 24 |
| EOR-2 | 1 | 23 |

EBR-1 and 2: Ethylene-1-butene copolymer rubbers.
EOR-1 and 2: Ethylene-1-octene copolymer rubbers.

TABLE 3

| | Composition (wt. %) | | | | | | |
|---|---|---|---|---|---|---|---|
| | BC | PP | EOR-1 | EOR-2 | EBR-1 | EBR-2 | Talc |
| Example 1 | 20 | 44 | 24 | | | | 12 |
| Comp. Example 1 | 20 | 44 | | 24 | | | 12 |
| Comp. Example 2 | 20 | 44 | | | 24 | | 12 |
| Comp. Example 3 | 20 | 38 | | | | 30 | 12 |

TABLE 4

| | MFR | FM | FS | IZOD (−30° C.) | UE | Flow mark |
|---|---|---|---|---|---|---|
| Ex. 1 | 38.4 | 14500 | 252 | 5.0 | >500 | ○ |
| Comp. Ex. 1 | 28.4 | 14200 | 249 | 6.2 | >500 | X |
| Comp. Ex. 2 | 26.0 | 14100 | 258 | 4.3 | 430 | X |
| Comp. Ex. 3 | 41.0 | 14700 | 258 | 4.4 | 164 | ○ |

MFR: Melt flow rate (g/10 min) :measuring temp. 230° C.
FM: Flexural modulus (kg/cm²).
FS: Flexural strength (kg/cm²).
UE: Ultimate elongation (%).
Flow mark: ○: Good, X: Bad.

INDUSTRIAL APPLICABILITY

The polypropylene resin composition according to this invention is excellent in rigidity and impact strength, and also excellent in injection moldability and excellent in flow properties and appearance of molded article. The polypropylene resin composition according to this invention are suitably used in injection-molded articles, particularly in exterior automotive trim molded articles by utilizing the physical properties as mentioned above.

What is claimed is:

1. A polypropylene resin composition which comprises:
    (1) 55 to 75% by weight of (A) a polypropylene resin consisting of a mixture of the following polymers (i) and (ii):
        (i) 10 to 40% by weight of a propylene-ethylene block copolymer comprised of a propylene homopolymer first segment and a propylene-ethylene random copolymer second segment, said second segment having an ethylene content of 25 to 55% by weight, and said second segment being present in said block copolymer in an amount of 5 to 30% by weight and
        (ii) 90 to 60% by weight of a propylene homopolymer having an intrinsic viscosity $[\eta]_P$ of 0.8 to 1.8 dl/g as measured in tetralin at 135° C., wherein the amount of (i)+(ii) is 100% by weight,
    (2) 21 to 30% by weight of (B) an ethylene-1-octene copolymer rubber having a melt flow rate measured according to JIS-K-6758 under a load of 2.16 kg at 190° C. of 2 to 10 g/10 min and having a 1-octene component of 20 to 25% by weight, and
    (3) 5 to 20% by weight of (C) talc having an average particle diameter of not more than 3 μm, wherein when the amount of the second segment contained in the propylene-ethylene block copolymer of the polypropylene resin (A) is designated as (A)' and the ethylene-1-octene copolymer rubber content is designated as (B)', the following expression is satisfied:

$$0.10 \leq \{(A)'/[(A)'+(B)']\} \leq 0.30,$$

when the composition is subjected to a tensile test according to ASTM D638 at 23° C., it exhibits an ultimate elongation of at least 400%, and the melt flow rate measured according to JIS-K-6758 under a load of 2.16 kg at 230° C. of the composition is at least 30 g/10 min.

2. The polypropylene resin composition according to claim 1, wherein in the polypropylene resin (A), each of the Q value, which is the weight average molecular weight (Mw)/number average molecular weight (Mn) ratio, of the propylene homopolymer part which is the first segment of the propylene-ethylene block copolymer (i) and the Q value of the propylene homopolymer (ii) is 3.0 to 5.0.

3. The polypropylene resin composition according to claim 1, wherein in the polypropylene resin (A), each of the isotactic pentad fraction of the propylene homopolymer part which is the first segment of the propylene-ethylene block copolymer (i) and the isotactic pentad fraction of the propylene homopolymer (ii) is at least 0.97 as calculated by $^{13}$C-NMR.

4. The propylene resin composition according to claim 1, wherein the intrinsic viscosity of the propylene-ethylene random copolymer part of the propylene-ethylene block copolymer (i) is 2.5 to 6.0 dl/g.

5. The propylene resin composition according to claim 1, wherein the density of ethylene-1-octene copolymer rubber (B) is 0.860 to 0.875 g/cm³.

6. The polypropylene resin composition according to claim 1, wherein the density of the polypropylene resin composition is 0.95 to 1.05 g/cm³.

7. An injection-molded article, characterized by being obtained by injection molding the polypropylene resin composition according to claim 1.

8. The injection-molded article according to claim 7, wherein the injection-molded article is for exterior automotive trim.

9. The polypropylene resin composition according to claim 1, wherein in the resin (A), the ratio of propylene homopolymer (ii) to the propylene-ethylene block copolymer (i) is 69–90% by weight to 10 to 31% by weight.

10. A polypropylene resin composition which comprises:
(1) 55 to 75% by weight of (A) a polypropylene resin consisting of a mixture of the following polymers (i) and (ii):
  (i) 10 to 40% by weight of a propylene-ethylene block copolymer comprised of a propylene homopolymer first segment and a propylene-ethylene random copolymer second segment, said second segment having an ethylene content of 25 to 55% by weight, and said second segment being present in said block copolymer in an amount of 5 to 30% by weight and
  (ii) 90 to 60% by weight of a propylene homopolymer having an intrinsic viscosity $[\eta]_P$ of 0.8 to 1.8 dl/g as measured in tetralin at 135° C., wherein the total of (i)+(ii) is 100% by weight, and the propylene homopolymer part of (i) and (ii) respectively has a Q value, which is the weight average molecular weight (Mw)/number average molecular weight (Mn) ratio, of 3.0 to 5.0 and an isotactic pentad fraction as calculated by $^{13}$C-NMR of at least 0.97,
(2) 21 to 30% by weight of (B) an ethylene-1-octene copolymer rubber having a melt flow rate measured according to JIS-K-6758 under a load of 2.16 kg at 190° C. of 2 to 10 g/10 min, a 1-octene component content of 20 to 25% by weight and a density of 0.860 to 0.875 g/cm$^3$₁, and
(3) 5 to 20% by weight of (C) talc having an average particle diameter of not more than 3 μm, wherein when the amount of the second segment contained in the propylene-ethylene block copolymer of the polypropylene resin (A) is designated as (A)' and the ethylene-1-octene copolymer rubber content is designated as (B)', the following expression is satisfied:

$$0.10 \leq \{(A)'/[(A'+(B)']\} \leq 0.30,$$

when the composition is subjected to a tensile test according to ASTM D638 at 23° C., it exhibits an ultimate elongation of at-least 400%, the melt flow rate measured according to JIS-K-6758 under a load of 2.16 kg at 230° C. of the composition is at least 30 g/10 min, and the density of the polypropylene resin composition is 0.95 to 1.05 g/cm$^3$.

* * * * *